US006951501B2

(12) United States Patent
Tan

(10) Patent No.: US 6,951,501 B2
(45) Date of Patent: Oct. 4, 2005

(54) METHOD FOR FORMING A GRINDING WORM FOR FORMING A CONICAL FACE GEAR THAT MESHES WITH A CONICAL INVOLUTE PINION

(75) Inventor: Jie Tan, Draper, UT (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/453,690

(22) Filed: Jun. 3, 2003

(65) Prior Publication Data

US 2003/0207650 A1 Nov. 6, 2003

Related U.S. Application Data

(62) Division of application No. 09/753,771, filed on Jan. 3, 2001, now Pat. No. 6,602,115.

(51) Int. Cl.[7] .................................................. B23F 23/10
(52) U.S. Cl. ............................ 451/5; 451/56; 451/72; 451/161; 451/47
(58) Field of Search .......................... 451/5, 47, 72, 451/56, 443; 125/11.01, 11.03, 11.04, 11.13

(56) References Cited

U.S. PATENT DOCUMENTS

| 4,627,770 A | 12/1986 | Kotthaus |
| 5,014,467 A | 5/1991 | Luhmer et al. |
| 5,338,134 A | 8/1994 | Peng |
| 5,494,475 A | 2/1996 | Basstein et al. |
| 5,681,207 A | 10/1997 | Nishida et al. |
| 5,720,584 A | 2/1998 | Sijtstra |
| 5,823,857 A | 10/1998 | Tan |
| 5,901,454 A | 5/1999 | Stadtfeld et al. |
| 5,941,124 A | 8/1999 | Tan |

FOREIGN PATENT DOCUMENTS

WO    WO 98/02268    1/1998

Primary Examiner—Robert A. Rose
(74) Attorney, Agent, or Firm—Harness Dickey & Pierce P.L.C.

(57) ABSTRACT

A method for dressing a grinding worm that is to be used in forming a conical face gear that meshingly engages a conical involute pinion. The method employs true conjugate action between a theoretical conical involute pinion and a conical face gear to accurately position a dressing tool relative to a grinding worm.

20 Claims, 5 Drawing Sheets

METHOD FOR FORMING A GRINDING WORM FOR FORMING A CONICAL FACE GEAR THAT MESHES WITH A CONICAL INVOLUTE PINION

CROSS-REFERENCE TO RELATED APPLICATIONS

This is a divisional application of U.S. Ser. No. 09/753,771 filed Jan. 3, 2001, U.S. Pat. No. 6,602,115, entitled "Tool and Method for Precision Grinding of a Conical Face Gear That Meshes With a Conical Involute Pinion".

STATEMENT REGARDING FEDERALLY SPONSORED RESEARCH

This invention was made with Government support from the Defense Advanced Research Projects Agency under Agreement Number MDA972-99-9-001. The government has certain rights in this invention.

TECHNICAL FIELD

The present invention relates generally to the manufacture of conical face gears and more particularly to a method for forming a grinding worm for use in the continuous generation grinding of conical face gears.

BACKGROUND OF THE INVENTION

Conical face gearing is a fairly recent innovation and consists of a conical involute gear, which serves as the pinion member, and a mating face gear that meshes with the conical involute pinion and satisfies true conjugate action. Conical face gearing offers gear train designers an alternative to spiral bevel gears in large shaft-angle, large reduction ratio angular power transmission applications. Conical face gearing possesses numerous unique features which provide solutions to special applications, such as the adjustment of backlash between a conical involute pinion and a conical face gear without affecting the tooth contact pattern and the conjugate action between the pinion and the conical face gear.

Despite their apparent advantages, conical face gears are not in widespread use, primarily because manufacturing methods for this type of gearing, especially production suitable methods, have heretofore not been developed. Several of the known processes for generating face gears are not readily suitable for the production manufacture of conical face gears. One such process is disclosed in U.S. Pat. No. 5,494,475 entitled "Tool for Producing Crown Wheels and Method for Producing Such a Tool", the disclosure of which is hereby incorporated by reference as if fully set forth herein. One disadvantage of this process concerns the geometry of the threaded tool that is employed to form the crown wheel; the '475 patent defines the threaded tool in a manner such that it has a true involute profile in the normal planar section of the thread. As such, crown wheels formed in this manner are inaccurate due to toe-heel effects that are well known in the industry and are thus unsuitable for demanding applications (e.g., aerospace applications).

Another disadvantage of the '475 patent concerns the concept of using a series of racks, each of which having a pressure angle from about 5 degrees to about 45 degrees and representing a thin cylindrical layer of the crown wheel. It is well known in the art that standard industrial gears typically have a whole tooth height equal to about 2.25 divided by the diametrical pitch. As such, gear generating tools are required to have a whole tooth height equal to about 2.5 divided by the diametrical pitch to provide the generated gear with sufficient operational clearance to permit meshing engagement with another gear. A rack having a pressure angle of about 40 degrees, however, can have a maximum height of only about 1.872 divided by the diametrical pitch. Accordingly, there are situations in which the rack cannot be used as a generating tool to form a gear or a gear cutting tool that conforms to industry standard tooth heights.

A final concern with the '475 patent concerns the manner in which a dressing tool is moved in a two-dimensional manner tangentially across the width of the threaded tool. Feeding the dressing tool in this manner will result in interference between the dressing tool and the adjacent tooth when the pressure angle is greater than about 35 degrees. This dressing method is unsuitable for the production of conical face gears having a relatively high degree of accuracy since the cone angle (and possibly a skew angle) in the pinion must be dealt with in three-dimensional space.

Another gear forming method that is specifically designed for conical face gearing is disclosed in commonly assigned U.S. Pat. No. 5,941,124 entitled "Face Gearing With Conical Involute Pinion", the disclosure of which is hereby incorporated by reference as if fully set forth herein. This method utilizes a formed wheel that emulates the action of one tooth of the pinion that is in meshing engagement with the conical face gear. The single-tooth action and the need to make multiple machining passes in forming a single tooth in the conical face gear renders this process extremely slow such that it is not well suited for volume production.

Accordingly, there is a need in the art for a tool and a method for forming a conical face gear which permits highly accurate gears to be produced at a relatively high rate of production.

SUMMARY OF THE INVENTION

In one preferred form, the present invention provides a method for dressing a grinding worm that is to be used in forming a conical face gear that meshingly engages a conical involute pinion. The method employs a theoretical conical involute pinion as a reference to orient a dressing tool relative to the grinding worm at an initial position and to control the movement of the dressing tool relative to the grinding worm. A plurality of straight generators that define a reference tooth on the theoretical conical involute pinion and the concept of true conjugate action between the theoretical conical involute pinion and the grinding worm are employed to define a plurality of dressing tool paths that are employed to position and move the dressing tool to form one or more threads in the grinding worm.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1A:
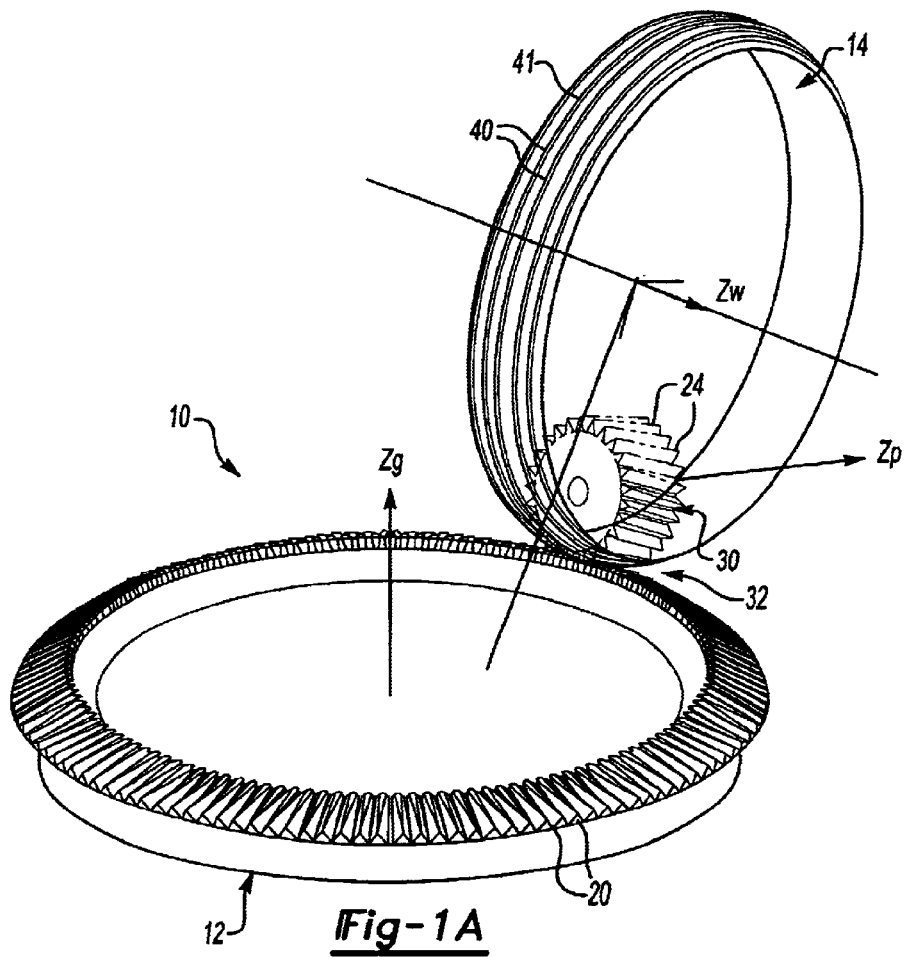
FIG. 1A is a perspective view of a precision grinding apparatus having a conical face gear and a grinding worm, the precision grinding apparatus being shown with a theoretical conical involute pinion that has been superimposed onto the conical face gear and the grinding worm.
Figure 1B:
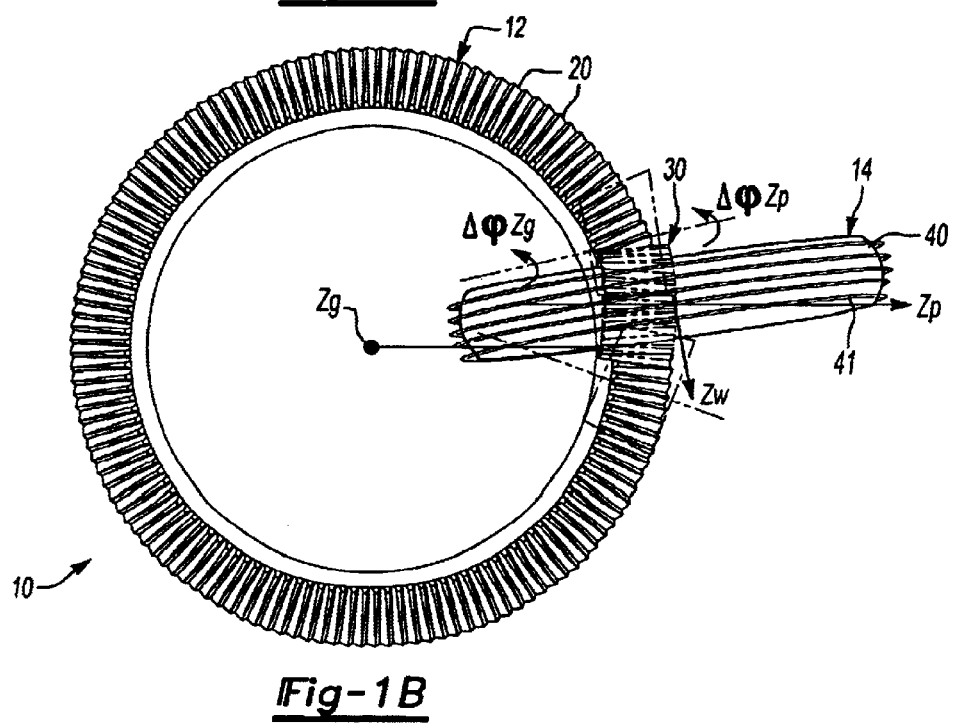
FIG. 1B is a top view of the precision grinding apparatus of FIG. 1A.

With reference to FIGS. 1A, 1B, 2A and 2B of the drawings, a precision grinding apparatus constructed and operated in accordance with the teachings of the present invention is generally indicated by reference numeral 10. Precision grinding apparatus 10 is shown to include a conical face gear 12, a grinding worm 14 and a dressing tool 16. The conical face gear 12 includes a plurality of teeth 20 that are adapted to meshingly engage a plurality of teeth 24 of a conical involute pinion 30. The pinion 30 and the conical face gear 12 constitute a conical face gear drive 32 in which the pinion 30 rotates about a pinion axis $Z_p$ and the conical face gear 12 rotates about a face gear axis $Z_g$. The conical involute pinion 30 is employed in the methodologies disclosed herein as a theoretical reference and as such, is referred to as being a "theoretical conical involute pinion" since it is not physically present. The theoretical conical involute pinion 30 is employed in the dressing and grinding processes disclosed herein as a reference for positioning the grinding worm 14 relative to the conical face gear 12 and for positioning the dressing tool 16 relative to the grinding worm 14.

The conical face gear 12 is preferably pre-formed and hardened in a heat-treatment operation, such as carburizing or nitriding, and includes excess stock that will be removed in a finishing operation performed by the precision grinding apparatus 10. As those skilled in the art will understand, excess stock is necessary to permit the distortions that occur during the heat treatment of the conical face gear 12 to be satisfactorily attenuated or eliminated.

In the presently preferred embodiment, the grinding worm 14 is formed from an abrasive-medium type material, such as aluminum oxide, a dressable CBN-type or other types of material that are conventionally used in the manufacture of other types of gears. The grinding worm 14 rotates about a grinding worm z-axis $Z_w$ with a grinding worm angular velocity $\omega_w$. In synchronization with the rotation of grinding worm 14, the conical face gear 12 rotates about the conical face gear axis $Z_g$ with a face gear angular velocity of $\omega_g$.

In the particular example provided, a plurality of grinding worm teeth 40 that are formed by a single spiral thread 41 contact the conical face gear 12 when the conical face gear 12 and the grinding worm 14 are synchronously rotating, with each of the grinding worm teeth 40 passing between a pair of the face gear teeth 20. A single, spiral gap 42 that results from the single thread 41 runs along the outer perimeter of the grinding worm 14 between the grinding worm teeth 40. The spiral gap 42 serves to process the grinding worm 14 over the various face gear teeth 20. Specifically, as the conical face gear 12 and grinding worm 14 synchronously rotate with rotational velocities of $\omega_g$ and $\omega_w$, respectively, a given face gear tooth 20 enters the spiral gap 42 and travels within the spiral gap 42 for several rotations of the grinding worm 14, until the given face gear tooth 20 exits the spiral gap 42. The spiral gap 42 begins at one end of the grinding worm 14 and ends at the opposite end of the grinding worm 14. Those skilled in the art will understand that the plurality of grinding worm teeth 40 may alternately be formed by a plurality of threads or spiral gaps 42 that are formed into the grinding worm 14.

In the presently preferred embodiment, the grinding worm 14 not only rotates about axis $Z_w$ synchronously with the rotation of the conical face gear 12, but also moves radially over the conical face gear 12, with the motion being termed "feed motion". The feed motion preferably causes the grinding worm to move radially from the outer end of the face gear teeth 20 to the inner end of the face gear teeth 20 to thereby ensure that the whole face width of the face gear teeth 20 is precisely ground by the grinding worm 14. In the presently preferred embodiment, the grinding worm moves in the radial direction at a predetermined feed rate (i.e., feed amount per revolution of the conical face gear 12) that is designed to satisfy the accuracy requirements for the finished face gear teeth 20. The direction of the feed motion is determined by the orientation of the teeth 24 of the conical involute pinion 30. Those skilled in the art will understand that the feed motion may be reversed (i.e., from the inner end to the outer end of the face gear teeth 20) as may deemed more appropriate in certain situations.

Figure 3:
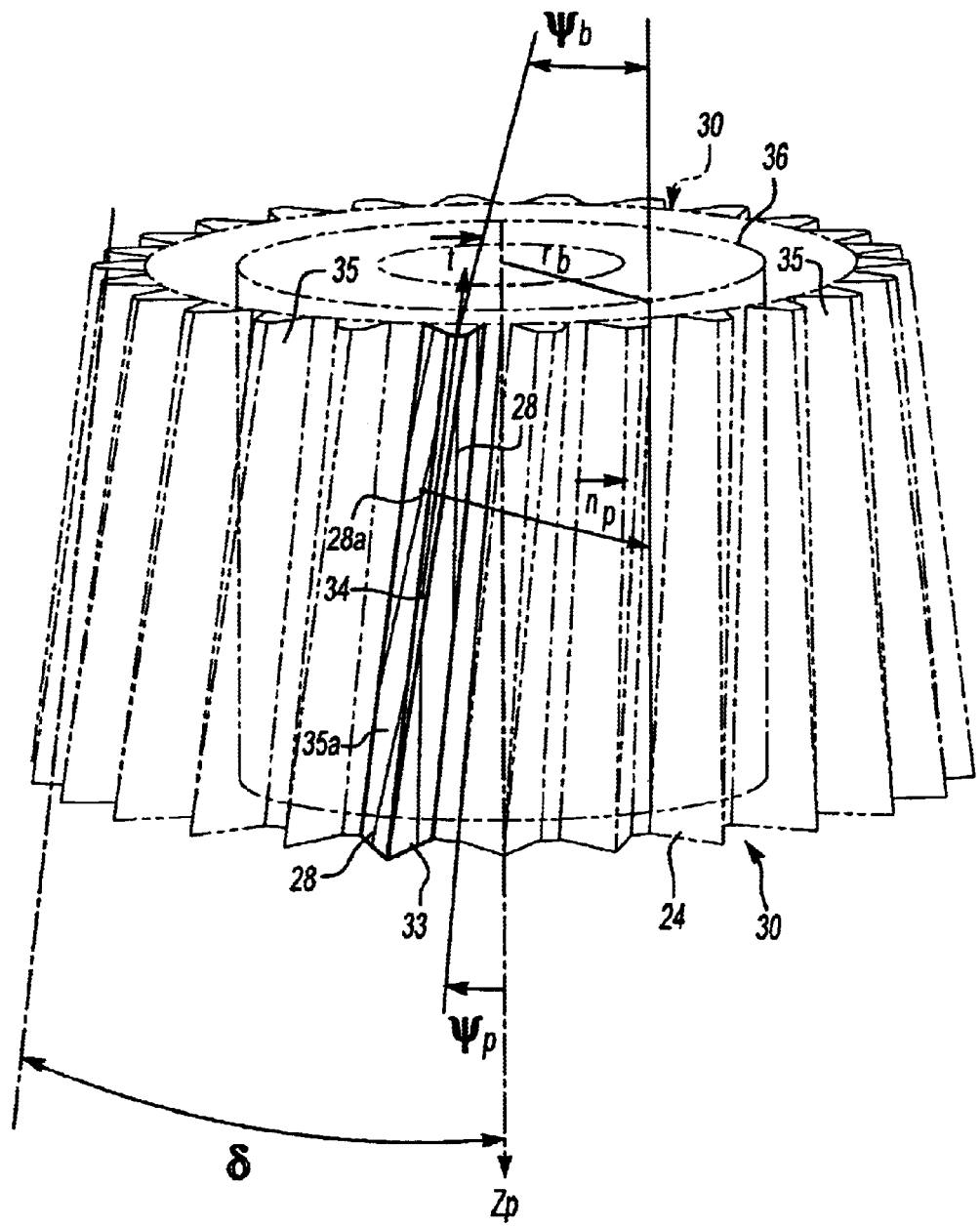
FIG. 3 is a perspective view of the theoretical conical involute pinion.

In FIG. 3, the features of the conical involute pinion 30 are illustrated in detail. The orientation of the teeth 24 of the pinion 30 is determined by two design parameters: the skew angle $\psi_p$ and the half-cone angle $\delta$. For reference purposes, a vector designated by $\vec{t}$ is attached to and aligned with a reference tooth 33, with the vector $\vec{t}$ emanating from the mid-height location 34 of the reference tooth 33. The tooth flanks 35 of the conical involute pinion 30 are surfaces of an involute helicoid generated from a base cylinder. A series of straight generators 28 are located on the involute helicoid tooth surfaces, covering the whole of the tooth flanks 35. Along any given generator 28, the tooth surface normal vector $\vec{n}_p$ is tangent to the base cylinder 36 (a theoretical design parameter) from which the involute helicoid is generated.

Figure 2A:
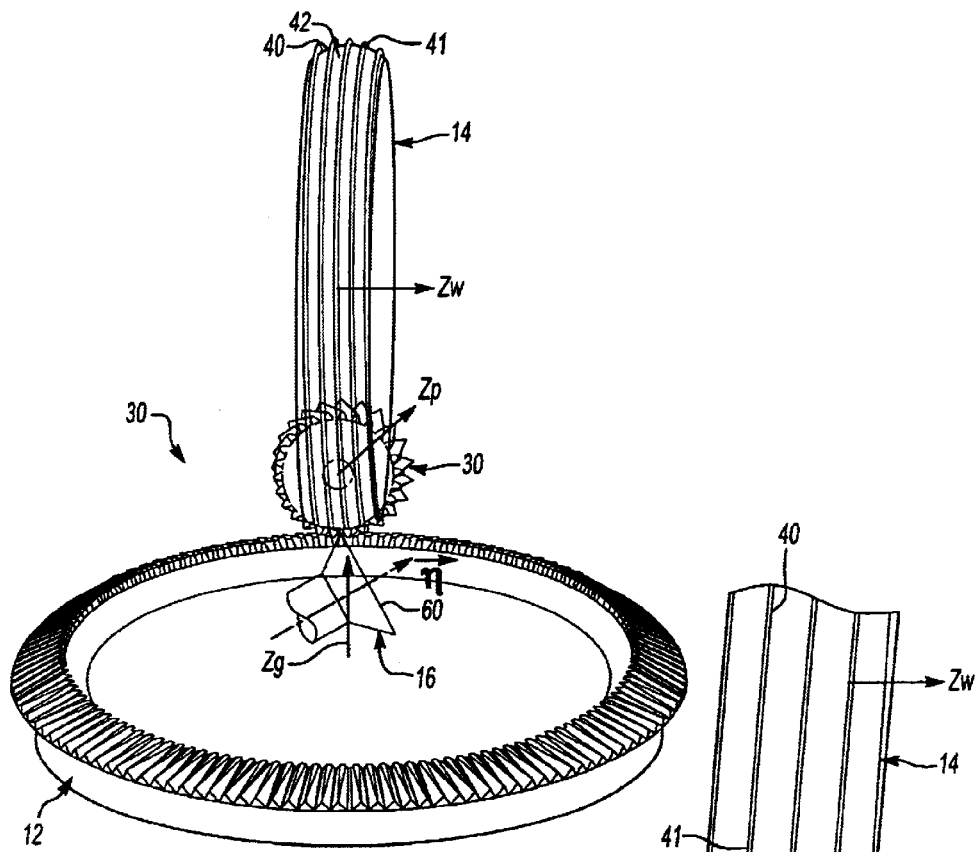
FIG. 2A is a side elevation view of the precision grinding apparatus of FIG. 1A, with a dressing tool being shown superimposed to the conical face gear, the grinding worm and the theoretical conical involute pinion.
Figure 2B:
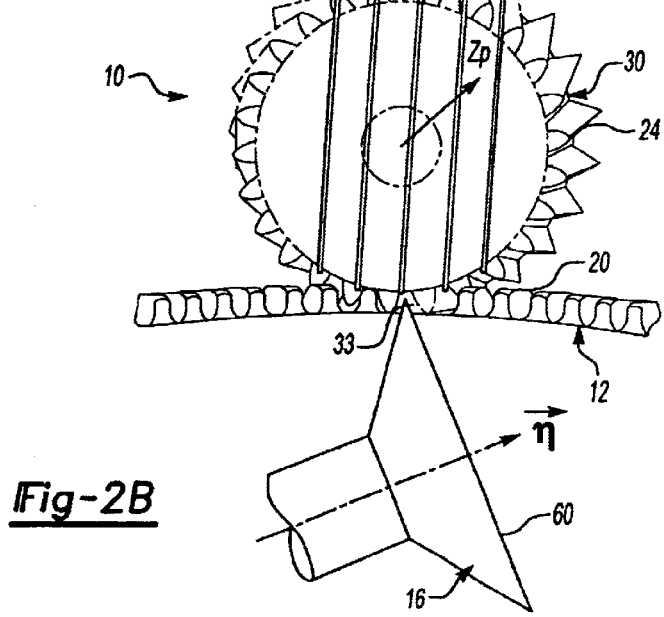
FIG. 2B is an enlarged view of a portion of FIG. 2A.
Figures 2C, 4:
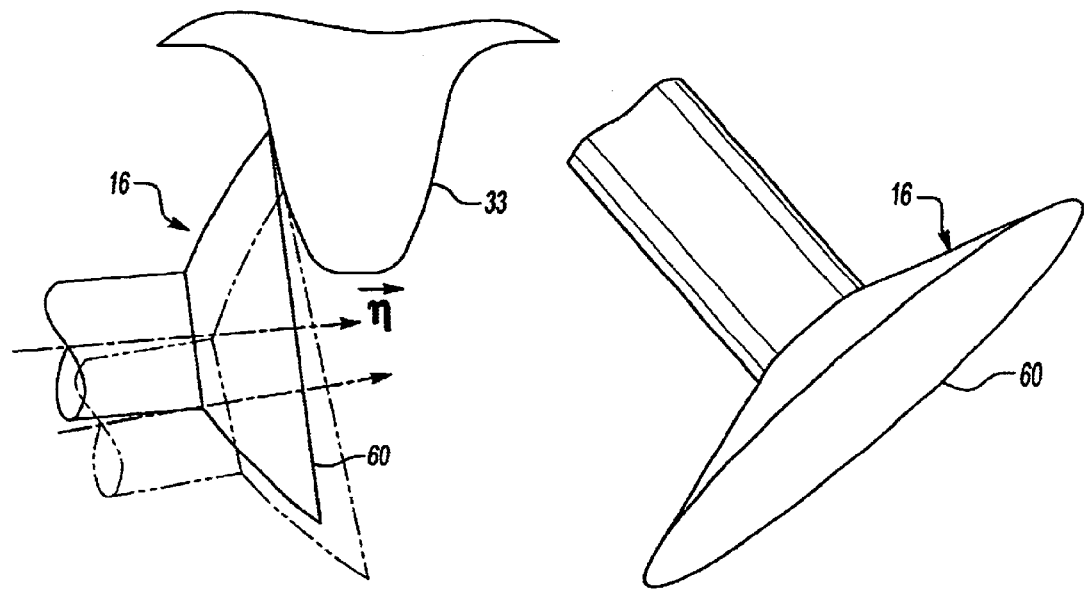
FIG. 2C is an enlarged portion of FIG. 2B illustrating the positioning of the dressing tool against the flank of a reference tooth of the theoretical conical involute pinion.
FIG. 4 is a perspective view of the dressing tool.

In FIG. 4, the preferred shape of the dressing tool 16 is illustrated to include a flat front surface 60 that is employed to form and maintain the thread profile of the grinding worm 14. With additional reference to FIGS. 2A and 2B, the positioning of the dressing tool 16 relative to the grinding worm teeth 40 is shown, along with the theoretical conical involute pinion 30 and the mating conical face gear 12 which serve as references for the initial positioning of the grinding worm 14 and the dressing tool 16. Those skilled in the art will understand that during the dressing operation, the theoretical conical involute pinion 30 and the conical face gear 12 are not physically present (i.e., not in meshing engagement with the grinding worm 14). Once the dressing tool 16 is placed in its initial position relative to the grinding worm 14, the grinding worm 14 is rotated about axis $Z_w$ while the dressing tool 16 is moved in a linear manner along a direction normal to the flat surface 60.

The dressing operation is performed in several operational passes, with each pass consisting of the steps of: determining an initial position of the dressing tool 16 and the grinding worm 14; positioning the dressing tool 16 and the grinding worm 14 at the initial position; synchronously moving the dressing tool 16 in a linear manner and rotating the grinding worm 14 so that the dressing tool 16 contacts the entire depth of the grinding worm thread 40; and withdrawing the dressing tool 16 from the grinding worm tooth 40. The next pass will employ a new initial position for the dressing tool 16 and a new direction of linear motion, but the new direction of linear motion is always normal to the flat surface 60, and the ratio of the angular velocity of the grinding worm 14 and the linear velocity of the dressing tool 16 remains constant throughout the dressing operation. Multiple dressing passes are necessary to form and/or dress the entire grinding worm tooth 40. In the particular example provided, the dressing operation is performed first on one side of the grinding worm 14 to generate a first side of the grinding worm tooth 40 and thereafter on a second side of the grinding worm 14 to generate the second side of the grinding worm tooth 40.

Figure 5A:
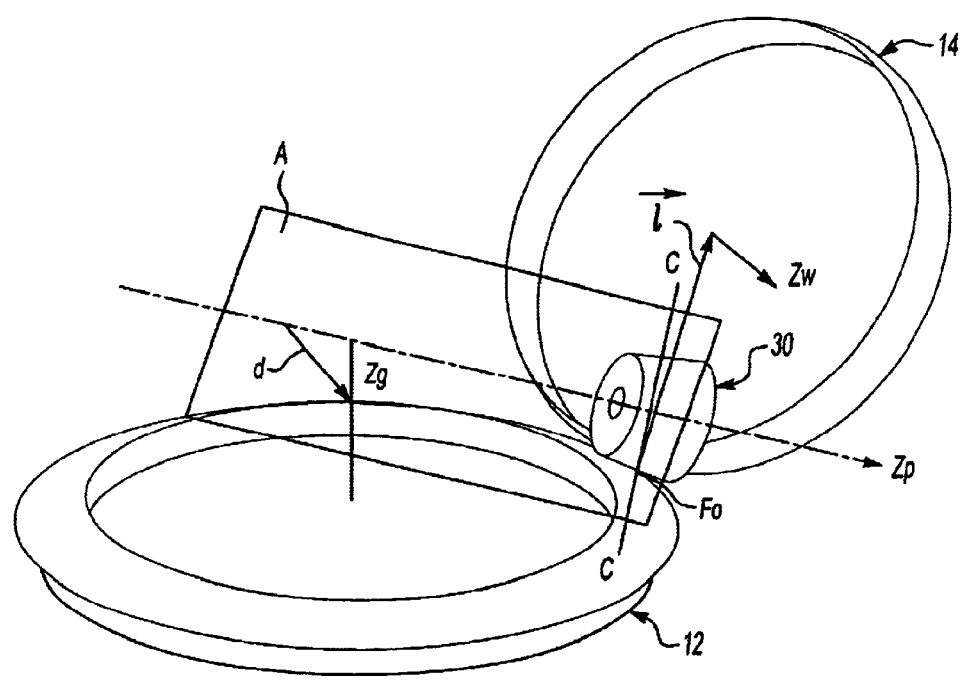
FIG. 5A is a perspective view of the precision grinding apparatus of FIG. 1A, illustrating several geometric references that are employed in the dressing of the grinding worm and grinding of the conical face gear.

In FIG. 5A, the installation of the grinding worm 14 is illustrated in side elevation. For purposes of discussion, several auxiliary geometric features that serve as references in specifying the position and/or motion of the grinding worm 14 and the dressing tool 16 are also shown.

A vector, designated by reference letter d, identifies the shortest distance between the rotational axis $Z_p$ of the pinion 30 and the rotational axis $Z_g$ of the conical face gear 12. A first plane, generally indicated by reference letter A, passes through the rotational axis $Z_p$ of the pinion 30 and is perpendicular to vector d. A line, designated as CC, is located on plane A and is perpendicular to the pinion axis $Z_p$. The pinion 30 is initially positioned such that the vector $\vec{t}$ that is attached to the reference tooth 33 and illustrated in FIG. 3 intersects line CC at point $F_0$, located at the mid-point of the face width of the conical face gear 12. From point $F_0$ a vector, designated as vector $\vec{F}$, is generated in a manner such that it is aligned with the current orientation of vector $\vec{t}$. Generated in this manner, vector $\vec{F}$ is fixed in space and serves as a reference for installing or positioning the grinding worm 14 to the conical face gear 12 and as the feed direction for the feed motion of the grinding worm 14 across the face width of the face gear teeth 20.

The installation of the grinding worm 14 is determined by a vector $\vec{1}$ that is contained in plane A, emanating from point $F_0$ in a direction perpendicular to vector $\vec{F}$. The length of vector $\vec{1}$ is determined by the reference pitch diameter ($D_w$) of the grinding worm 14, with the reference pitch diameter being the diameter of the circle that is offset from the outer diameter of the grinding worm 14 by the amount of addendum of the thread on the grinding worm, according to equation (1):

$$|\vec{1}| = (D_w/2) \tag{1}$$

Figure 5B:
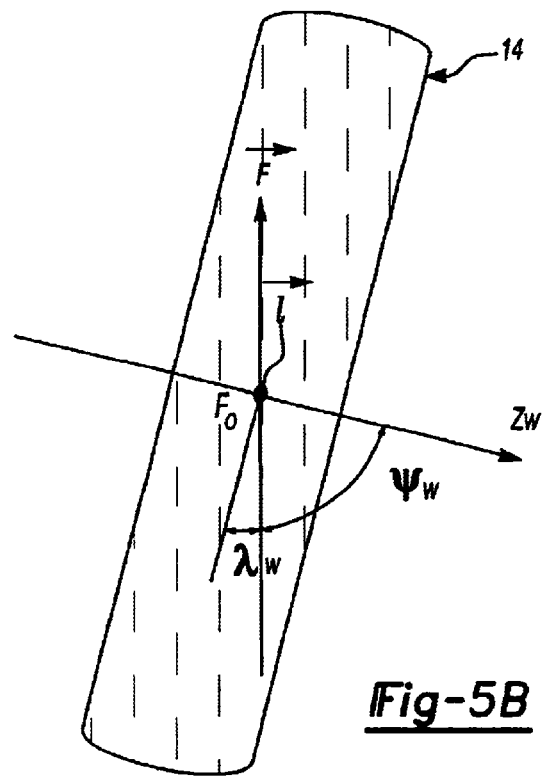
FIG. 5B is a bottom view of the grinding worm illustrated in FIG. 1A, illustrating several geometric references that are employed in the dressing of the grinding worm and grinding of the conical face gear.

With additional reference to FIG. 5B, the axis of rotation $Z_w$ of the grinding worm 14 is installed at the end of vector $\vec{1}$ such that it is perpendicular to vector $\vec{1}$ and the angle between the axis of rotation $Z_w$ of the grinding worm 14 and vector $\vec{F}$ is $\psi_w$. The angle $\psi_w$ is related to the lead angle $\lambda_w$ of the grinding worm 14 by equation (2):

$$\psi_w = 90° - \lambda_w \tag{2}$$

Those skilled in the art will understand that in installing the grinding worm 14, the angle $\psi_w$ should be measured in proper orientation according to the hand-type (i.e., left or right hand) of the grinding worm 14. The lead angle $\lambda_w$ is determined by equation (3):

$$\lambda_w = \sin^{-1}\left(\frac{N_w}{D_w P_d}\right) \tag{3}$$

where $N_w$ is the number of threads 41 on the grinding worm 14, $D_w$ is the reference pitch diameter of the grinding worm 14 and $P_d$ is the diametrical pitch of the conical face gear set (i.e., the conical face gear 12 and the pinion 30).

With the grinding worm installation given above, the generation of the conical face gear 12 is carried out with two motions of the grinding worm 14 relative to the conical face gear 12. The first motion is synchronous rotation of both the grinding worm 14 and the conical face gear 12 about their respective axes of rotation $Z_w$ and $Z_g$. The angular velocities of the grinding worm 14 and the conical face gear 12 are related as provided in equation (4):

$$\frac{\omega_g}{\omega_w} = \frac{N_w}{N_g} \tag{4}$$

where $\omega_g$ is the angular velocity of the conical face gear 12, $\omega_w$ is the angular velocity of the grinding worm and $N_g$ is the number of teeth 20 on the conical face gear 12. As the conical face gear 12 and grinding worm 14 rotate synchronously, the motion in which the grinding worm 14 is fed across the face width of the face gear teeth 20 proceeds along the feed direction (as defined by vector $\vec{F}$), preferably starting from the outer end of the conical face gear 12 and moving towards the inner end of the face gear teeth 20. As noted above, this motion may also be reversed if deemed appropriate under certain conditions. The magnitude of the feed motion, or the amount of movement along the vector $\vec{F}$ per revolution of the conical face gear 12, is determined by a predetermined set of accuracy requirements for the face gear teeth 20 that are being ground. Those skilled in the art will readily understand how to control the magnitude of the feed motion so as to satisfy set of accuracy requirements and as such, this need not be discussed in more detail.

The profile of the grinding worm teeth 40 is formed and maintained by the dressing tool 16, with the flat surface 60 being made of an appropriate material such as diamond grit that is implanted in a bounding base material. Referring back to FIGS. 2A and 2B, the dressing tool 16 is illustrated as being located in the spiral gap 42, with the dressing tool 16 and the grinding worm 14 being oriented in a first initial position relative to the conical face gear 12. The initial reference position of the grinding worm 14 is determined by using pinion 30 as a reference as described above. The position of the flat surface 60 of the dressing tool 16 and the synchronous motion of the dressing tool 16 and grinding worm 14 are detailed by the following procedure, wherein the conical face gear 12 is used as a stationary, theoretical reference and is not physically present (i.e., not contacting the grinding worm 14 ) during the dressing operation:

a) Referring to FIG. 3, the vector $\vec{t}$ is aligned with the orientation of the reference tooth 33 and attached thereto at the mid-height of the reference tooth 33 as discussed above.

b) Referring to FIGS. 5A and 5B, superimposing the theoretical conical involute pinion 30 to the conical face gear 12 and the grinding worm 14 in the manner discussed above and thereafter establishing point $F_0$ and vector $\vec{F}$.

c) Referring to FIGS. 2A, 2B and 3, locating a straight generator 28a on one of the flanks 35a of the reference tooth 33 and placing the flat surface 60 of the dressing tool 16 in tangent contact with the flank 35a of the reference tooth 33 along the straight generator 28a such that the normal $\vec{n}$ of the flat surface 60 is aligned with the normal $\vec{n}_p$ of the reference tooth 33 at the given generator 28a.

d) Referring to FIGS. 1B and 2A through 2C, rolling the theoretical conical involute pinion 30 over the conical face gear 12, which is assumed to be fixed at this stage, such that the pinion teeth 24 maintain tangent contact the face gear teeth 20 and the theoretical conical involute pinion 30 and the conical face gear 12 obey true conjugate action. This rotation causes the rotational axis $Z_p$ of the theoretical conical involute pinion 30 to rotate about the rotational axis $Z_g$ of the conical face gear 12, with the amount of rotation being equal to an angle $\Delta\phi_{Zg}$ that is obtained from the mathematical condition detailed in the vectorial scalar product equation (5):

$$\vec{n} \cdot \vec{F} = 0. \quad (5)$$

As those skilled in the art will understand, the solution of the angle $\Delta\phi_{Zg}$ is a simple mathematical problem since the rotational axis $Z_g$ of the conical face gear 12, the (nominal) rotational axis $Z_p$ of the theoretical conical involute pinion 30, the feed direction vector $\vec{F}$ and the surface normal $\vec{n}_p$ of the given generator 28 on the reference tooth 33 are all well defined as discussed above. Those skilled in the art will understand that the angle $\Delta\phi_{Zg}$ is greatly exaggerated in FIG. 1B for the purposes of illustration only and that in practice, the angle $\Delta\phi_{Zg}$ is typically relatively small.

e) Simultaneously with the rotation of the pinion rotational axis $Z_p$ about the rotational axis $Z_g$ of the conical face gear 12, the theoretical conical involute pinion 30 rotates through an angle $\Delta\phi_{Zp}$ about the pinion rotational axis $Z_p$, with the magnitude of the angle $\Delta\phi_{Zp}$ being defined by the relationship defined by equation (6):

$$\frac{\Delta\varphi_{Zp}}{\Delta\varphi_{Zg}} = \frac{N_g}{N_p} = \frac{\Delta s}{\Delta\varphi_{Zg} r_b \cos\psi_b} \quad (6)$$

where $N_p$ is the number of teeth on the theoretical conical involute pinion 30 and $N_g$ is the number of teeth on the conical face gear 12. The remaining variables (i.e., $\Delta s$, $r_b$ and $\psi_b$) will be discussed in detail in step f), below.

f) Simultaneous with steps d) and e), above, the dressing tool 16 is moved three-dimensionally such that the flat surface 60 maintains tangent contact with the surface of the flank 35a of the reference tooth 33 by performing the same angular movement ($\Delta\phi_{Zg}$) about the rotational axis $Z_g$ of the conical face gear 12 and translates by a distance $\Delta s$ along its own normal $\vec{n}$ with $\Delta s$ being determined through equation (6). Referring back to the relationship defined by equation (6), $r_b$ is the radius of the base cylinder of the pinion 30 and $\psi_b$ is the base helix angle as shown in FIG. 3.

After the adjustments to the positions of the theoretical conical involute pinion 30 and the dressing tool 16 have been made, the grinding worm 14 and the dressing tool 16 are synchronously moved, such that the grinding worm 14 rotates about its rotational axis $Z_w$ and the dressing tool 16 translates in the direction of the normal $\vec{n}$ of the flat surface 60, with the velocity $v_d$ of the dressing tool 16 being related to the angular velocity $\omega_w$ of the grinding worm 14 by equation (7):

$$v_d = \frac{N_w}{N_p} r_b \cos\psi_b \omega_w. \quad (7)$$

The procedure defined by steps a) through g) determines a single path of the dressing tool 16 in forming a single surface of the grinding worm teeth 40. The procedure places the dressing tool at a predetermined initial position and controls the simultaneous movement of the dressing tool 16 and the grinding worm 14.

In practical implementation, it is preferred that the dressing tool 16 start at a point on the determined tool path that is not in contact with the grinding worm 14, move in the manner defined above so as to contact the grinding worm 14 and travel through the entire length of the spiral gap 42 and thereafter be withdrawn from the grinding worm 14. Thereafter, the procedure defined by steps a) through g) is repeated many times, with each iteration of the procedure using a different one of the straight generators 28 on the reference tooth 33, until a first side of the grinding worm teeth 40 is formed. The procedure is then repeated to form the second side of the grinding worm teeth 40. In the particular example provided, approximately forty different straight generators 28 were employed on each side of the reference tooth 33 to define the paths of the dressing tool 16 in forming the grinding worm teeth 40. Those skilled in the art will readily understand, however, that the number of straight generators 28 that are employed to define the paths of the dressing tool 16 can be selected to provide a desired level of accuracy; more straight generators 28 may be employed if a higher degree of accuracy is desired, while fewer straight generators may be employed if a lesser degree of accuracy is required. Those skilled in the art will also understand that the amount of time to fully dress the grinding worm 14 will vary depending on the number of straight generators 28 that are being employed to define the paths of the dressing tool 16.

Figure 6:
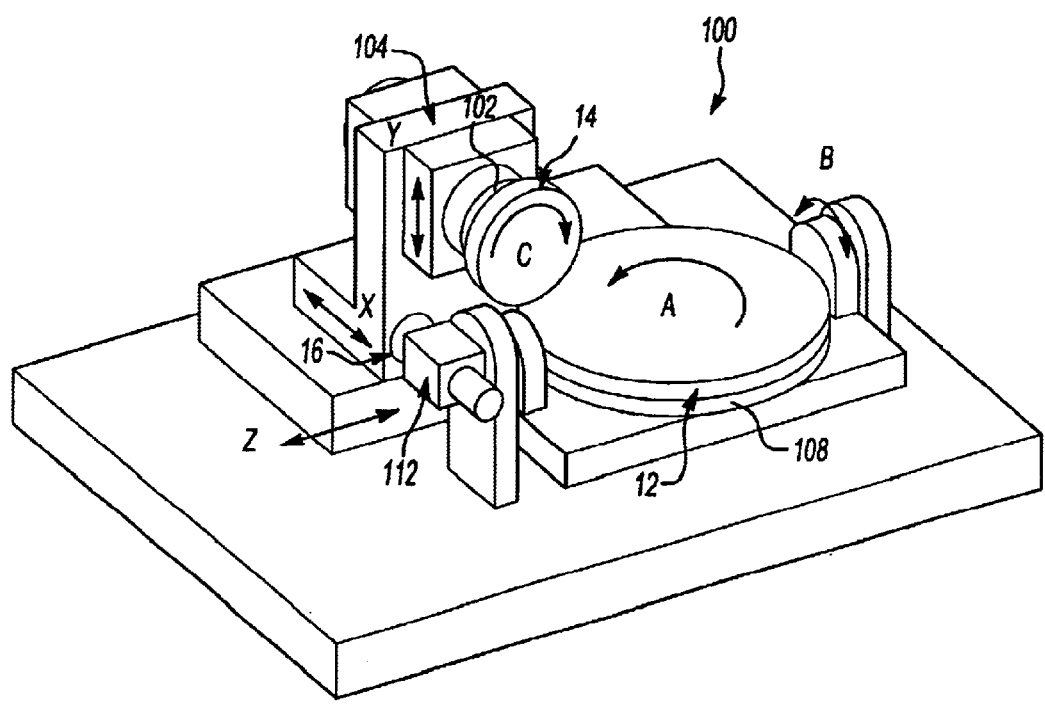
FIG. 6 is a perspective view of a multi-axis CNC grinding machine for carrying out the methods of the present invention.

With reference to FIG. 6, a multi-axis CNC (computer numerical control) grinding machine 100 for performing the dressing and grinding methods of the present invention is illustrated. The grinding worm 14 is mounted on a tool spindle 102 and rotates in the direction of arrow C. The tool spindle 102 is mounted to a translating table 104, permitting the rotary axis of the tool spindle 102 to be moved in a desired manner along three linear axes, X, Y and Z, which in the particular example illustrated are oriented in an orthogonal relationship. The conical face gear 12 is mounted on a rotary table 108 and rotates in the direction of arrow A.

The dressing tool 16 is mounted to a swing table 112 and is rotatable as shown by arrow B. The location of the tool spindle 102 relative to the rotary table 108 and the dressing tool 16 (in the X, Y and Z directions) is controlled by translating table 104.

Relative positions and movements between the grinding worm 14, the dressing tool 16 and the conical face gear 12 are calculated in the manner discussed above, providing a-series of coordinates and paths that are employed to generate a NC (numerical control) program to control the movements of the tool spindle 102, the translating table 104, the rotary table 108 and the swing table 112. Execution of the NC program will then dress the grinding worm 14 and grind the conical face gear 12 in the manner described above. Accordingly, with the dressing and grinding methods of the present invention, the process of converting into machine coordinates and generating NC programs may be accomplished with commercially available CAM (computer-aided-manufacturing) software packages and NC post-processors customized for the design configuration of the grinding and dressing machine that is used.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for dressing a grinding worm for forming a conical face gear having a plurality of face gear teeth, the method comprising:
   providing a dressing tool having a flat dressing surface;
   providing a theoretical conical involute pinion having a plurality of pinion teeth, one of the plurality of pinion teeth being a reference tooth with a pair of tooth flanks; and
   employing the conical face gear and the theoretical conical involute pinion to position the flat dressing surface of the dressing tool in tangent contact with a first one of the tooth flanks;
   rotating the theoretical conical involute pinion about a rotational axis of the conical face gear while the conical face gear is fixed and the teeth of the conical face gear and the teeth of the theoretical conical involute pinion maintain tangent contact, the conical face gear and the theoretical conical involute pinion obeying true relative conjugate action such that the theoretical conical involute pinion also rotates about a pinion rotational axis; and
   simultaneously with the rotation of the theoretical conical involute pinion, rotating the dressing tool and translating the dressing tool by a predetermined amount $\Delta s$ in a direction normal to the flat surface of the dressing tool so that the flat surface of the dressing tool remains in tangent contact with the first one of the tooth flanks;
   wherein the step of employing the conical face gear and the theoretical conical involute pinion to position the flat dressing surface of the dressing tool includes:
   locating a plurality of straight generators on the first one of the tooth flanks;
   generating a vector d from a rotational axis Zp of the theoretical conical involute pinion to a rotational axis Zg of the conical face gear, the vector d being perpendicular to the rotational axis Zp and the rotational axis Zg;
   generating a plane A that is perpendicular to the vector d and passes through the rotational axis Zp;
   generating a line CC that is perpendicular to the rotational axis Zp and lies on the plane A;
   generating a vector $\vec{t}$ that is attached to the reference tooth on the theoretical conical involute pinion;
   superimposing the theoretical involute pinion and the vector $\vec{t}$ to the conical face gear such that the vector $\vec{t}$ intersects the line CC at a point $F_0$;
   generating a vector $\vec{F}$ that commences from the point $F_0$ and is parallel to the vector $\vec{t}$; and
   aligning the flat surface of the dressing tool to a first one of the plurality of straight generators such that a vector $\vec{n}$ in the normal direction of the flat surface is aligned with the normal of the reference tooth at the first one of the straight generators.

2. A method for dressing a grinding worm for forming a conical face gear having a plurality of face gear teeth, the method comprising:
   providing a dressing tool having a flat dressing surface;
   providing a theoretical conical involute pinion having a plurality of pinion teeth, one of the plurality of pinion teeth being a reference tooth with a pair of tooth flanks; and
   employing the conical face gear and the theoretical conical involute pinion to position the flat dressing surface of the dressing tool in tangent contact with a first one of the tooth flanks;
   rotating the theoretical conical involute pinion about a rotational axis of the conical face gear while the conical face gear is fixed and the teeth of the conical face gear and the teeth of the theoretical conical involute pinion maintain tangent contact, the conical face gear and the theoretical conical involute pinion obeying true relative conjugate action such that the theoretical conical involute pinion also rotates about a pinion rotational axis;
   simultaneously with the rotation of the theoretical conical involute pinion, rotating the dressing tool and translating the dressing tool by a predetermined amount $\Delta s$ in a direction normal to the flat surface of the dressing tool so that the flat surface of the dressing tool remains in tangent contact with the first one of the tooth flanks;
   determining a first quantity Nw of grinding worm teeth;
   determining a second quantity Np of theoretical conical involute teeth;
   determining a base cylinder radius $r_b$;
   determining a base helix angle $\psi_b$ of the reference tooth;
   determining an angular velocity $\omega_w$ of the grinding worm; and
   synchronously rotating the grinding worm about a grinding worm axis Zw and translating the dressing tool in the direction normal to the flat surface at a predetermined velocity $v_d$.

3. The method of claim 2, wherein the velocity $v_d$ is calculated from the equation:

$$v_d = \frac{Nw}{Np} r_b \cos(\psi_b) \omega_w.$$

4. A method for dressing a grinding worm for forming a conical face gear having a plurality of face gear teeth, the method comprising:

providing a dressing tool having a flat dressing surface;

providing a theoretical conical involute pinion having a plurality of pinion teeth, one of the plurality of pinion teeth being a reference tooth with a pair of tooth flanks; and employing the conical face gear and the theoretical conical involute pinion to position the flat dressing surface of the dressing tool in tangent contact with a first one of the tooth flanks;

rotating the theoretical conical involute pinion about a rotational axis of the conical face gear while the conical face gear is fixed and the teeth of the conical face gear and the teeth of the theoretical conical involute pinion maintain tangent contact, the conical face gear and the theoretical conical involute pinion obeying true relative conjugate action such that the theoretical conical involute pinion also rotates about a pinion rotational axis; and simultaneously with the rotation of the theoretical conical involute pinion, rotating the dressing tool and translating the dressing tool by a predetermined amount $\Delta s$ in a direction normal to the flat surface of the dressing tool so that the flat surface of the dressing tool remains in tangent contact with the first one of the tooth flanks;

wherein the step of rotating the theoretical conical involute pinion about the rotational axis of the conical face gear includes the step of calculating an angle $\Delta\phi_{zg}$ by which the pinion rotational axis rotates about the rotational axis of the conical face gear.

5. The method of claim 4, wherein the angle $\Delta\phi_{zg}$ is obtained from the equation:

$$\vec{n} \cdot \vec{F} = 0.$$

6. The method of claim 4, wherein the conical face gear has a first quantity Ng of face gear teeth, the theoretical conical involute pinion has a second quantity Np of pinion teeth and the step of rotating the theoretical conical involute pinion about the rotational axis of the conical face gear includes the step of calculating an angle $\Delta\phi_{zp}$ by which the theoretical conical involute pinion rotates about the pinion axis.

7. The method of claim 6, wherein the angle $\Delta\phi_{zp}$ is calculated from the equation:

$$\Delta\varphi_{Zp} = \Delta\varphi_{Zg} \frac{N_g}{N_p}.$$

8. The method of claim 6, wherein the step of translating the dressing tool by a predetermined amount $\Delta s$ simultaneously with the rotation of the theoretical conical involute pinion includes the steps of:

determining a base cylinder radius $r_b$; and determining a base helix angle $\psi_b$ of the reference tooth.

9. The method of claim 1, wherein $\Delta s$ is calculated from the equation:

$$\Delta s = \frac{(N_g)(\Delta\varphi_{Zg})(r_b)(\cos\psi_b)}{N_p}.$$

10. The method of claim 1, further comprising selecting a lead angle of the grinding worm.

11. A method for dressing a grinding worm for forming a conical face gear having a plurality of face gear teeth, the method comprising:

providing a dressing tool having a flat dressing surface;

providing a theoretical conical involute pinion having a plurality of pinion teeth, one of the plurality of pinion teeth being a reference tooth with a pair of tooth flanks; and locating a plurality of straight generators on a first one of the tooth flanks;

aligning the flat surface of the dressing tool to a first one of the plurality of straight generators such that a vector $\vec{n}$ in a direction normal to the flat surface is aligned with the reference tooth at the first one of the straight generators;

rotating the theoretical conical involute pinion about a rotational axis of the conical face gear while the conical face gear is fixed and the teeth of the conical face gear and the teeth of the theoretical conical involute pinion maintain tangent contact, the conical face gear and the theoretical conical involute pinion obeying true relative conjugate action such that the theoretical conical involute pinion also rotates about a pinion rotational axis;

simultaneously with the rotation of the theoretical conical involute pinion, rotating the dressing tool and translating the dressing tool by a predetermined amount $\Delta s$ in a direction normal to the flat surface of the dressing tool so that the flat surface of the dressing tool remains in tangent contact with the first one of the tooth flanks.

12. The method of claim 11, wherein prior to rotating the theoretical conical involute pinion the method further includes:

generating a vector d from a rotational axis Zp of the theoretical conical involute pinion to a rotational axis Zg of the conical face gear, the vector d being perpendicular to the rotational axis Zp and the rotational axis Zg;

generating a plane A that is perpendicular to the vector d and passes through the rotational axis Zp;

generating a line CC that is perpendicular to the rotational axis Zp and lies on the plane A;

generating a vector $\vec{t}$ that is attached to the reference tooth on the theoretical conical involute pinion;

superimposing the theoretical involute pinion and the vector $\vec{t}$ to the conical face gear such that the vector $\vec{t}$ intersects the line CC at a point $F_0$; and generating a vector $\vec{F}$ that commences from the point $F_0$ and is parallel to the vector $\vec{t}$.

13. The method of claim 12, further comprising:

determining a first quantity Nw of grinding worm teeth;

determining a second quantity Np of theoretical conical involute teeth;

determining a base cylinder radius $r_b$;

determining a base helix angle $\psi_b$ of the reference tooth;

determining an angular velocity $\omega_w$ of the grinding worm; and synchronously rotating the grinding worm about a grinding worm axis Zw and translating the dressing tool in the direction normal to the flat surface at a predetermined velocity $v_d$.

14. The method of claim 13, wherein the velocity $v_d$ is calculated from the equation:

$$v_d = \frac{Nw}{Np} r_b \cos(\psi_b) \omega_w.$$

15. The method of claim 13, wherein the step of rotating the theoretical conical involute pinion about the rotational axis of the conical face gear includes the step of calculating an angle $\Delta\phi_{zg}$ by which the pinion rotational axis rotates about the rotational axis of the conical face gear.

16. The method of claim 15, wherein the angle $\Delta\phi_{z_g}$ is obtained from the equation:

$$\vec{n} \cdot \vec{F} = 0.$$

17. The method of claim 15, wherein the conical face gear has a first quantity Ng of face gear teeth, the theoretical conical involute pinion has a second quantity Np of pinion teeth and the step of rotating the theoretical conical involute pinion about the rotational axis of the conical face gear includes the step of calculating an angle $\Delta\phi_{zp}$ by which the theoretical conical involute pinion rotates about the pinion axis.

18. The method of claim 17, wherein the angle $\Delta\phi_{zp}$ is calculated from the equation:

$$\Delta\varphi_{Zp} = \Delta\varphi_{Zg} \frac{N_g}{N_p}.$$

19. The method of claim 17, wherein the step of translating the dressing tool by a predetermined amount $\Delta s$ simultaneously with the rotation of the theoretical conical involute pinion includes the steps of:

determining a base cylinder radius $r_b$; and determining a base helix angle $\psi_b$ of the reference tooth.

20. The method of claim 19, wherein $\Delta s$ is calculated from the equation:

$$\Delta s = \frac{(N_g)(\Delta\varphi_{Zg})(r_b)(\cos\psi_b)}{N_p}.$$

* * * * *